United States Patent Office 2,881,905
Patented Apr. 14, 1959

2,881,905

DEVICES FOR USE IN THE CONVEYANCE OF ROOT CROPS

John Clement Hawkins, Silsoe, England, assignor to National Research Development Corporation, London, England Application November 4, 1955, Serial No. 545,092

Claims priority, application Great Britain November 8, 1954

5 Claims. (Cl. 198—211)

This invention relates to devices for use in the conveyance of root crops such as potatoes.

In certain agricultural machines or installations for handling root crops such as potatoes, the roots are transferred from one place to another by conveying devices and during such movement there is a risk that the roots may be bruised or damaged by impact with hard surfaces.

According to the present invention, in a device for use in the conveyance of root crops at least one surface which the roots may strike comprises a tautly stretched sheet of fabric such as canvas.

Such a sheet will give a little when struck by the roots and will thus considerably reduce the risk of bruising or damage.

The taut stretching of the fabric may be achieved in various ways. For instance, the tautness may be imparted during the manufacture of the device by stretching the fabric tightly between rigid supports and permanently securing it in place. It is preferred, however, to hold the fabric sheet in tension by means of resilient elements such as springs, which will maintain the tension in the fabric despite permanent or temporary stretching or shrinking of the fabric, for instance in wet weather.

The invention finds numerous applications in agricultural machinery and installations for the handling of root crops. For instance, in one form of the invention the device is in the form of an elevating drum in which a wall against which the incoming roots are thrown consists of a tautly stretched sheet of fabric. The sheet of fabric is preferably of frusto-conical form so that roots which roll down the sheet in the upper part of the drum towards the centre thereof are also thereby discharged from the drum.

In another form of the invention the device is in the form of a rotary sorting table, the surface of which consists of a tautly stretched sheet of fabric. The roots and other matter to be sorted are delivered on to the sorting table at one point and are carried round by the rotation of the table in front of several sorters who select suitable roots and remove them from the table. By providing the rotary sorting table with a surface consisting of a tautly stretched sheet of fabric the risk of damage to the roots as they are delivered on to the table top is much reduced. Before the table has completed one revolution the matter carried thereon will all effectively have been sorted so that only waste matter is left. This can be deflected from the table by a stationary deflector disposed over the table just before the point at which the roots and other matter to be sorted are delivered on to the table.

The selected roots removed from the table by the sorters can be deposited by the sorters into sacks or other receptacles. This has the disadvantage that when a receptacle is full, the sorter who has been filling this receptacle has to stop sorting to replace the receptacle. It is preferred, therefore, to provide a shelf beneath the rotary sorting table which rotates therewith and on to which the selected roots removed from the table can be deposited, a fixed deflector being disposed over the shelf, at some suitable point, to deflect such roots from the shelf. The roots so deflected may be discharged into a receptacle or on to a conveyor which conveys them away for disposal as required. An advantage of this arrangement is that the sorters can devote all their time to selecting and removing roots from the sorting table.

Preferably there is a movable deflector disposed over the shelf in front of the fixed deflector and adapted to be placed either in an operative position in which it deflects roots from the shelf before these roots reach the fixed deflector or in an inoperative position in which it lies substantially clear of the shelf so that roots carried round on the shelf will be deflected therefrom by the fixed deflector, the two deflectors cooperating with separate discharge chutes. Thus while a receptacle is being filled at one chute, a filled receptacle at the other chute can be removed and replaced by an empty one. Thus the discharge of the roots can proceed continuously without interruption.

The invention may be performed in various ways and one particular form of potato harvesting machine embodying the invention will now be described by way of example with reference to the accompanying drawings, in which—

Figure 1:
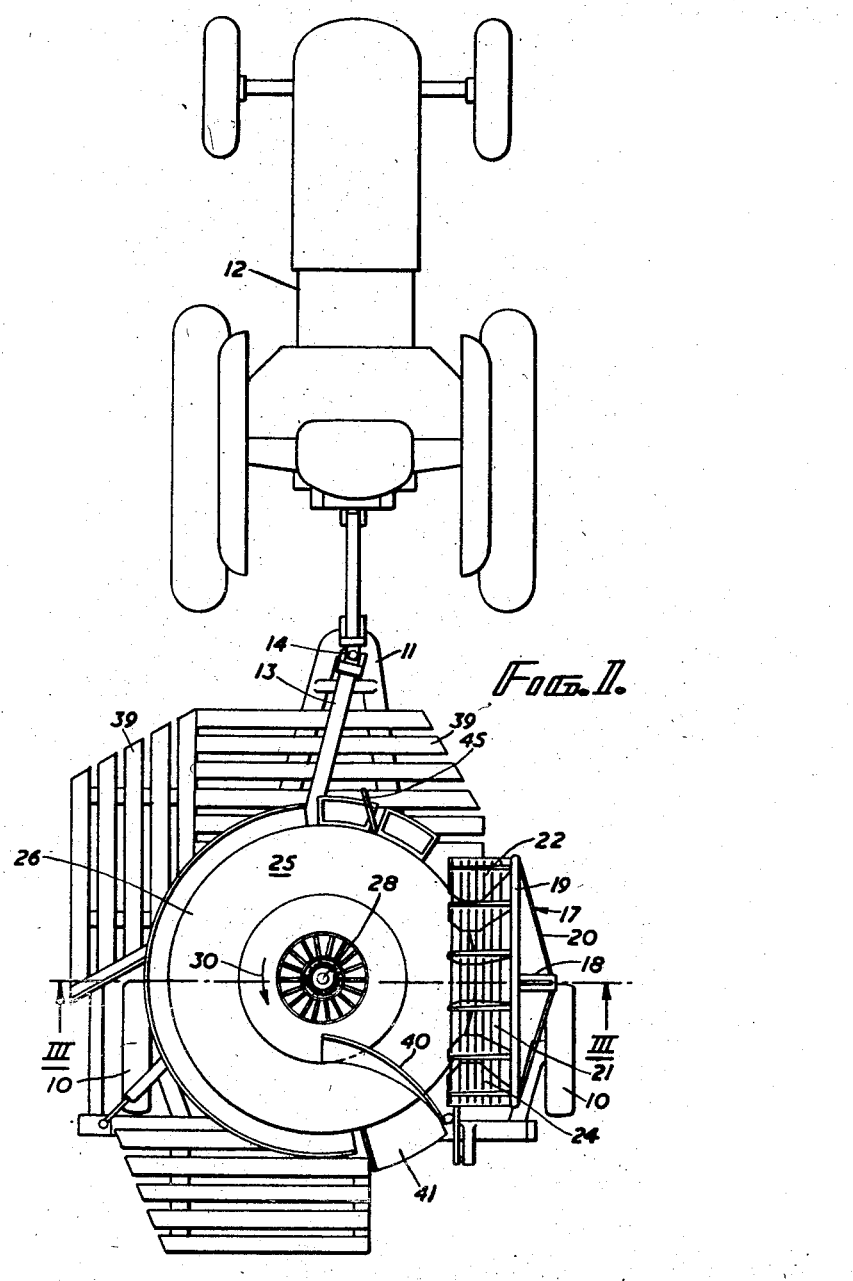
Figure 1 is a plan view of the machine attached to the rear of the tractor.
Figure 2:
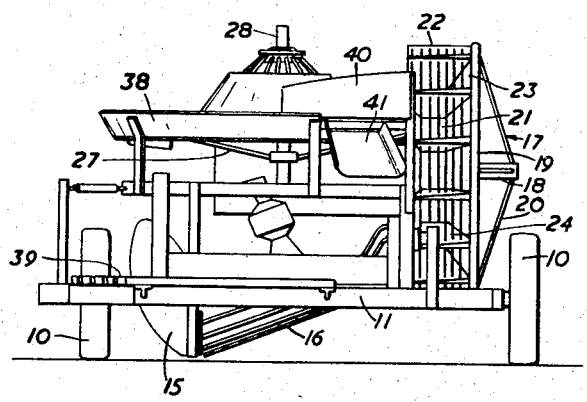
Figure 2 is a rear view of the machine.

The potato harvesting machine shown in the drawings is in the form of a trailer mounted on wheels 10 and comprises an approximately triangular framework 11, the apex of which is arranged for attachment to the draw bar of a tractor 12. The machine is also provided with a driving shaft 13 arranged for attachment through a universal coupling 14 with the power take-off of the tractor.

Disposed in the lower part of the machine is an inclined rotatable share 15. The tractor is driven across a potato field towing the machine and is guided so that the share 15 passes along the ridges in which the potatoes are growing. The share turns substantially the whole ridge, including soil, stones and the potato plants, on to an inclined rotating spider member 16. This spider member allows small stones and loose soil to fall back on to the ground but retains the potatoes, haulm, large stones and clods of earth. Near the highest point of the spider it passes beneath a deflector (which may be a board or, preferably, a roller). The deflector traps the haulm and separates the potatoes therefrom, deflecting the latter into the bottom of a rotary elevating drum 17. The parts hitherto mentioned are all known in principle in potato harvesting machines and so will not be further described in any detail, except for the elevating drum 17 which is of novel construction, embodying the present invention.

The elevating drum 17 is rotatably mounted on a horizontal shaft 18 and is driven through gearing (not shown) by the shaft 13. The drum comprises a vertical circular framework 19 braced by radial spokes 20. On the inner side of the framework is a deep cylindrical flange 21, the radius of which is approximately half the radius of the framework 19. Projecting axially from the rim of the framework 17 on the same side as the flange 21 is a fence 22 formed of circumferential bars. This fence allows soil, small stones and the like to fall through but retains larger bodies such as potatoes and large stones in the drum. Stretched between the rim of the framework 19 and the outer end of the flange 21 is a frusto-conical tautly stretched canvas sheet 23. At intervals around the drum within the fence are radial paddles 24, the inner edges of the paddles being inclined so as to lie close to the canvas sheet 23. Potatoes which are deflected into the drum from the spider 16 at or near the bottom of the drum strike the canvas sheet 23 which absorbs their impetus so that they then fall gently on to the fence 22. As the drum is rotated the paddles 24 lift the potatoes, together with large stones and the like, up to a level somewhat above the shaft 18, when the potatoes and other large bodies will roll down towards the centre of the drum. Since the canvas sheet 23 is of frusto-conical form this movement will also direct the potatoes and other large bodies outwardly from the drum so that they are discharged therefrom at a higher level than that at which they entered the drum.

Figure 3:
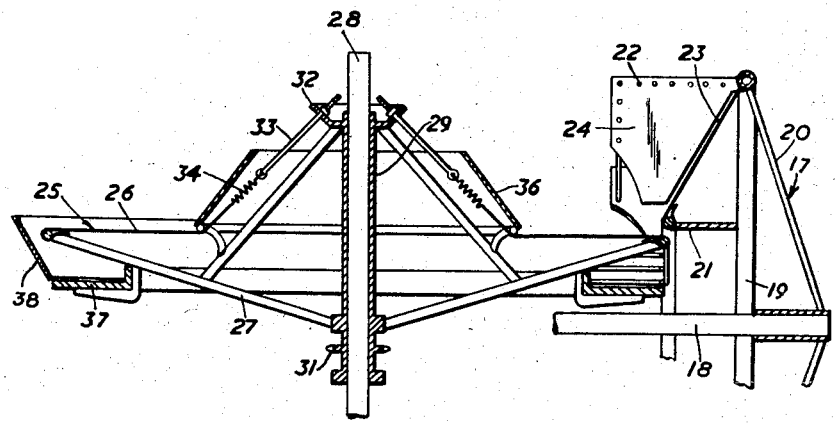
Figure 3 is a vertical section taken along the line III—III in Figure 1.
Figure 4:
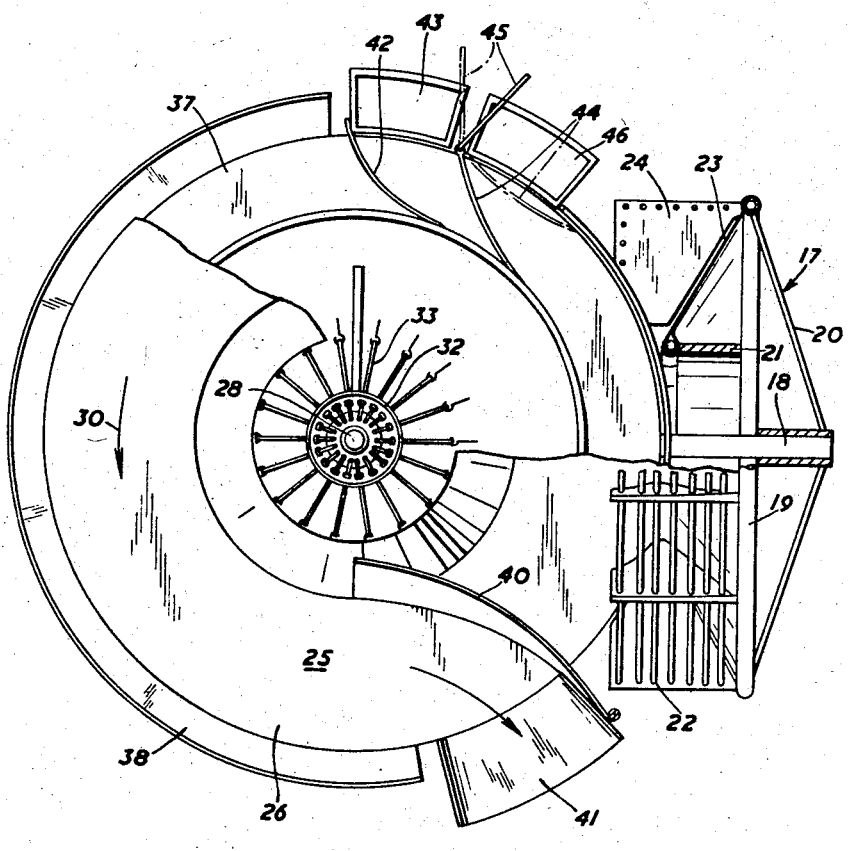
Figure 4 is a plan view of the sorting table and elevating conveyor on a larger scale with parts broken away and parts shown in section.

The potatoes and other large bodies so discharged fall on to a rotary sorting table 25, the surface of which consists of a tautly stretched sheet of canvas 26. The outer periphery of the canvas sheet 26 is anchored to the outer rim of a circular framework 27 mounted on an upright shaft 28. The framework 27 is attached to a hub 29 which can rotate on the shaft 28 in the direction of the arrow 30 being driven by the shaft 13 through gearing including a gear wheel 31. At the upper end of the hub 28 is a cup member 32 which provides an anchorage for several radial bolts 33. The lower ends of these bolts are attached to tension springs 34 which are in turn attached to the inner edge of the canvas sheet 26. The sheet is passed under an inner circular member 35 of the framework 27 so that the major portion of its surface provides a flat tautly stretched annular fabric sorting table. A frusto-conical shield 36 is attached to the member 35 to protect the springs 34 and to prevent potatoes and other bodies from falling off the inner edge of the sorting table. The segment of the table that is nearest to the elevating drum 17 enters this drum, as best shown in Figures 3 and 4, so that the potatoes and other large bodies which are discharged from the elevating drum fall on to the sorting table 25 and are carried round thereon.

Attached to the framework 27 beneath the sorting table is a shelf 37 which rotates with the table. An inclined fixed chute 38 extends upwardly around the periphery of the shelf for a substantial proportion of this circumference. There is a gap between the chute 38 and the outer edge of the sorting table 25 big enough to enable any potatoes to pass through.

The machine is provided with platforms 39 on which several sorters can stand.

Over the rear portion of the sorting table, before it enters the elevating drum, is a curved deflector 40. This deflector catches any waste matter that has been left by the sorters on the sorting table and deflects such matter over a chute 41 from which it falls down on to the ground.

On the shelf 37 a similar fixed deflector 42 is provided which will deflect into a bagging-off chute 43 any potatoes placed on the shelf 37. There is a movable deflector 44 before the fixed deflector 42, which can be moved from the position in which it is shown in full lines in Figure 4 to the position shown in dotted lines, and back again, by means of a hand lever 45. When the movable deflector 44 is in the position shown in full lines in Figure 4 it will deflect any potatoes that have been placed on the shelf 37 into a bagging-off chute 46, so that no potatoes will pass on to the fixed deflector 42 and the bagging-off chute 43. When the lever 45 is in this position, therefore, a receptacle under the bagging-off chute 43 can be removed and replaced. When the receptacle underneath the bagging-off chute 46 is full and an empty receptacle is in place underneath the bagging-off chute 43, the operator merely swings over the lever 45, thus moving the movable deflector 44 to close the bagging-off chute 46 so that any potatoes on the shelf 37 are carried round further and are deflected by the fixed deflector 42 into the bagging-off chute 43.

In operation, the tractor tows the machine along a ridge of potatoes, the share 15 turns the ridge on to the spider 16 where some soil and small stones are separated. When the deflector which cooperates with the spider is reached, haulm is separated from the potatoes which are then deflected, together with large stones and soil lumps, into the elevating drum 17. In the elevating drum further separation of soil and small stones may take place. The potatoes and any remaining stones and soil lumps fall on to the rotating sorting table 25 and are carried round thereon in front of the sorters. The sorters select potatoes, remove them from the sorting table, and deposit them on the shelf 37 by dropping them down the chute 38. By the time the fixed deflector 40 is reached, all the selected potatoes will have been removed from the sorting table. The remaining waste matter is swept off the rotating table by the fixed deflector 40 so that a clean table surface enters the elevating drum to receive more potatoes, stones and the like.

The sorted potatoes on the shelf 37 are discharged into one of the bagging-off chutes 43 or 46.

Instead of bagging the potatoes on the machine they may be discharged into a bulk receptacle. In this case only one potato discharging chute need be provided, the chute 46, the lever 45 and the movable deflector 44 being dispensed with and the chute 43 leading to a conveyor which discharges potatoes continuously into the bulk receptacle, for instance into a truck driven along beside the machine.

The tensioning of the fabric may be done by rubber or other elastic elements in place of the springs 34. Alternatively, if the fabric has adequate elasticity this may itself provide adequate tautness, in which case spring or elastic tensioning elements may be omitted.

In a further modification the direction of rotation of the sorting table 25 is reversed, the curved deflector 40 and the chute 41 in this case occupying the position occupied in the illustrated embodiment by the parts 42 to 46, and vice versa.

The expression "fabric" is used herein in a broad sense to include not only woven cloth such as canvas, but also any flexible sheet material such as rubber, or plastic sheet.

What I claim as my invention and desire to secure by Letters Patent is:

1. An elevating conveyor for raising root crops from a lower level to a higher level comprising a rotatable drum, means for rotating said drum about a substantially horizontal axis, an end wall fixed in said drum for rotation therewith consisting of tautly stretched flexible sheet material, circumferential root crop retaining means around the periphery of said drum, means for discharging root crops into said drum against said end wall, and formations in said drum which raise said root crops as said drum rotates.

2. An elevating conveyor according to claim 1 in which said end wall is of frusto-conical form.

3. An elevating conveyor comprising a rotary drum, means mounting said drum for rotation about a horizontal axis, said drum comprising a frusto-conical axial end wall concentric to its said axis of rotation, a generally cylindrical fence secured coaxially around the outer periphery of said end wall and projecting axially from said periphery in the direction of convergence of said end wall, a plurality of paddles secured in said drum and extending generally radially between said fence and said wall, said drum being open at its axial end opposite to said end wall for receiving and discharging articles, whereby articles delivered onto said fence and between said paddles at the lower portion of the drum may be elevated by the paddles incident to rotation of the conveyor and delivered onto said frusto-conical end wall for discharge by gravity through the open end of the drum.

4. An elevating conveyor as defined in claim 3, including means associated with said drum for delivering articles onto said fence in the lower portion of said drum.

5. An elevating conveyor as defined in claim 3, wherein said end wall comprises a suitable supporting frame, and tautly stretched flexible sheet material secured over said frame.

References Cited in the file of this patent

UNITED STATES PATENTS

| | | |
|---|---|---|
| 945,636 | Svenson | Jan. 4, 1910 |
| 1,936,116 | Nyberg | Nov. 21, 1933 |
| 2,232,431 | Biloco | Feb. 18, 1941 |
| 2,529,023 | Helms | Nov. 7, 1950 |
| 2,562,338 | Snyder | July 31, 1951 |